United States Patent
Defiebre

(10) Patent No.: US 11,651,245 B2
(45) Date of Patent: May 16, 2023

(54) USER INTERFACE (UI) DESIGN COMPLIANCE DETERMINATION

(71) Applicant: SAP SE, Walldorf (DE)

(72) Inventor: Daniel Defiebre, Mannheim (DE)

(73) Assignee: SAP SE, Walldorf (DE)

( * ) Notice: Subject to any disclaimer, the term of this patent is extended or adjusted under 35 U.S.C. 154(b) by 991 days.

(21) Appl. No.: 16/218,327

(22) Filed: Dec. 12, 2018

(65) Prior Publication Data

US 2020/0193306 A1 Jun. 18, 2020

(51) Int. Cl.
| | |
|---|---|
| *G06N 20/00* | (2019.01) |
| *G06N 5/04* | (2023.01) |
| *G06F 16/901* | (2019.01) |
| *G06F 17/18* | (2006.01) |
| *G06N 7/00* | (2023.01) |

(52) U.S. Cl.
CPC .......... *G06N 5/04* (2013.01); *G06F 16/9027* (2019.01); *G06F 17/18* (2013.01); *G06N 7/005* (2013.01); *G06N 20/00* (2019.01)

(58) Field of Classification Search
CPC .......... G06N 5/04; G06N 20/00; G06N 7/005; G06F 16/9027; G06F 17/18
See application file for complete search history.

(56) References Cited

U.S. PATENT DOCUMENTS

| | | | |
|---|---|---|---|
| 2004/0083232 A1* | 4/2004 | Ronnewinkel | G06F 16/951 |
| 2015/0074037 A1* | 3/2015 | Sarferaz | G06F 16/252 |
| | | | 707/602 |
| 2018/0203571 A1 | 7/2018 | Dayanandan et al. | |
| 2020/0133643 A1* | 4/2020 | Hou | G06K 9/6215 |

OTHER PUBLICATIONS

Bengoetxea, Endika, Pedro Larrañaga, I. Bloch, A. Perchant, and C. Boeres. "Inexact graph matching using learning and simulation of Bayesian networks. An empirical comparison between different approaches with synthetic data." (2000). (Year: 2000).*

Annika Hinze et al, "Model-Driven GUI & interaction Design Using Emulation", Jun. 19-23, 2010, 6 pages.

(Continued)

*Primary Examiner* — Casey R. Garner
(74) *Attorney, Agent, or Firm* — Fountainhead Law Group P.C.

(57) ABSTRACT

Embodiments relate to learning and determining user interface (UI) compliance with design guidelines. Those guidelines may enforce operability with requirements of an external UI platform. Embodiments receive as an input, a UI comprising a plurality of elements. An image of the UI is rendered, and a plurality of elements of the UI are identified from the image according to a recursive procedure. The plurality of elements are stored in a first logic tree exhibiting a first hierarchical structure having the plurality of elements as leaf nodes. The first logic tree is compared to a second logic tree exhibiting a second hierarchical structure, that is labeled with semantic metadata and stored within a knowledge base of a database. Input for the comparison may comprise the tree and/or additional meta information. Based upon the comparing, an output is generated indicating a similarity between the first logic tree and the second logic tree.

15 Claims, 16 Drawing Sheets

(56) References Cited

OTHER PUBLICATIONS

Kevin Moran et al, "Machine Learning-Based Prototyping of Graphical User Interfaces for Mobile Apps", Jun. 5, 2018, 26 pages.
Xiaojun Meng et al, "Wade; Simplified GUI Add-On Developmetn for Third-Party Software", May 1, 2014, 10 pages.
Morgan Dixon et al, "Content and Hierarchy in Pixel-Based Methods For Reverse Engineering Interface Structure", May 7-12, 2011, 10 pages.
Judy Bowen et al, "Using Formal Models to 1,10,11 Design User Interfaces: a Case Study", Jan. 1, 2007, 8 pages.
Extended European Search Report for EP Application No. 19211981, dated Apr. 14, 2020, 9 pages.
Communication Under Rule 71(3) in EP Application No. 19211981.6-1231, dated Dec. 17, 2021, 6 pages.

\* cited by examiner image

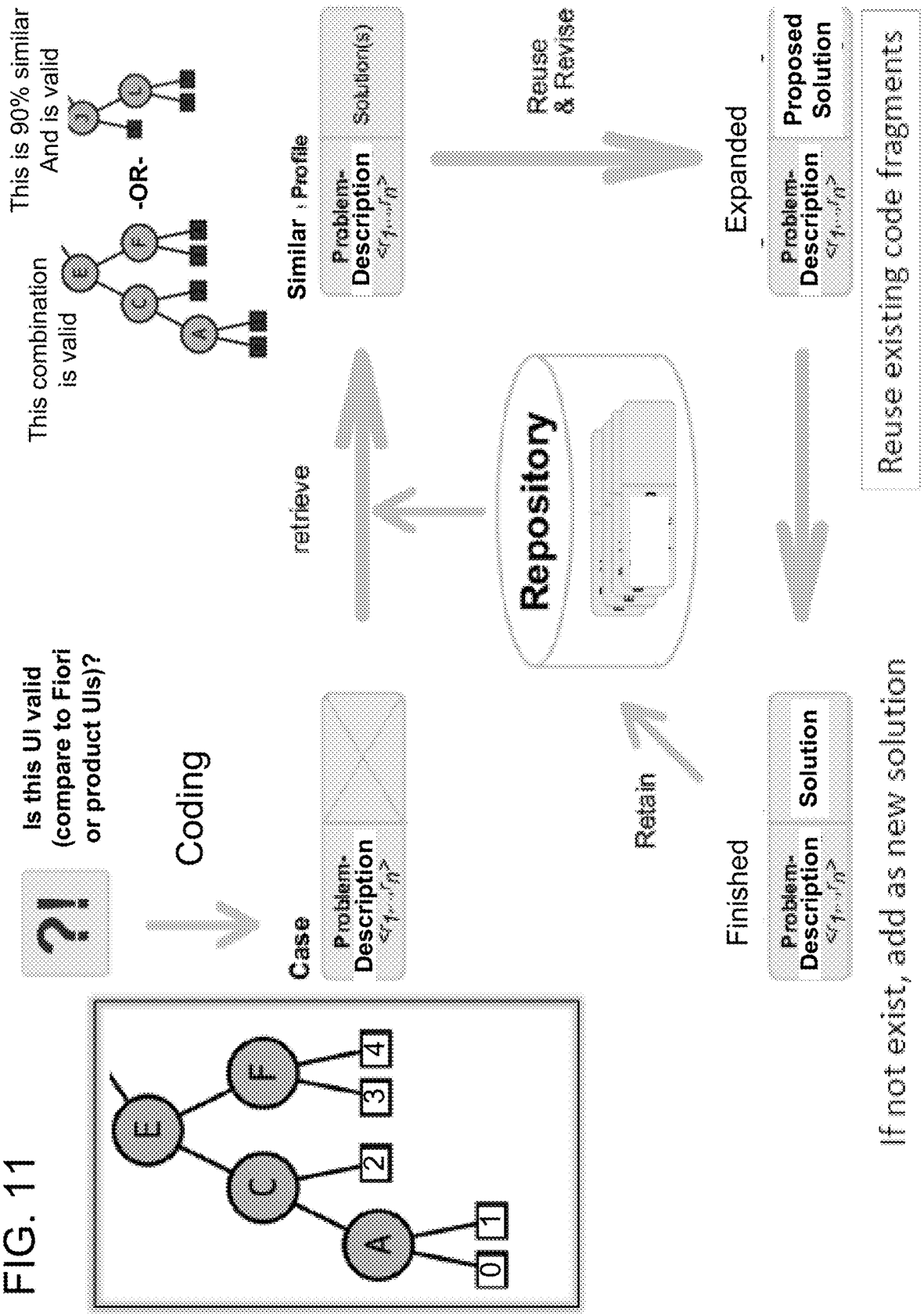

USER INTERFACE (UI) DESIGN COMPLIANCE DETERMINATION

BACKGROUND

Unless otherwise indicated herein, the approaches described in this section are not prior art to the claims in this application and are not admitted to be prior art by inclusion in this section.

Graphical User Interfaces (GUIs) are commonly created by a designer creating a mockup, and then forwarding that mockup to a developer. The GUI that actually results, must be in compliance with formal requirements of a particular GUI platform User Experience (UX), e.g., SAP FIORI®.

Design guidelines are sets of recommendations towards good practice in design. They are intended to provide clear instructions to designers and developers regarding how to adopt specific principles, such as intuitiveness, learnability, efficiency, and consistency.

Design guidelines provide helpful advice on how to achieve a design principle that can be platform-specific or cross-platform. However, ensuring consistency of a given User Interface (UI) with formal and informal design requirements, is often performed manually through an expert, and can be a time-consuming task.

SUMMARY

Embodiments relate to systems and methods configured for learning and determining compliance of a GUI with design guidelines. Those guidelines may enforce operability with requirements of an external user interface (UI) platform (e.g., SAP FIORI®), and/or internal consistency between GUIs produced by a same software vendor. Embodiments receive as an input, a UI comprising a plurality of interface elements. An image of the GUI is captured, and a plurality of elements of the interface are identified from the image according to a recursive procedure. The plurality of elements are stored in a first logic tree exhibiting a first hierarchical structure having the plurality of specified elements as leaf nodes, such as a button or an icon. The first logic tree is compared to a second logic tree (or set of logic trees) exhibiting a second hierarchical structure.

The logic tree presents the interface elements as leaves (e.g., a magnifying glass and text input field), and correlate the interface elements to human logic terms (e.g., a magnifying glass and text input field together comprise a search field). The logic tree also includes meta information regarding a position relation between elements and logic terms. This meta information can be presented through the order (from left) and hierarchy (inside) of the tree.

The tree will be stored within a knowledge base of a database. The knowledge database presents the given structured information from given GUIs as a machine-learned UI framework.

Based upon a comparing, an output is generated indicating a similarity between the logic tree of the instant interface and a set of the most similar trees, in order to give recommendations to the user. The output can show the differences with a similarity metric (e.g., 70% other GUIs using on top of a table a search field). The output may also offer some human meta information—such as the location (e.g., GIT address) of the implementation allowing reuse of code.

The following detailed description and accompanying drawings provide a better understanding of the nature and advantages of various embodiments.

BRIEF DESCRIPTION OF THE DRAWINGS

FIG. 11 shows a simplified view of a machine learning approach utilizing case-based reasoning.

DETAILED DESCRIPTION

Described herein are methods and apparatuses implementing verification of compliance of a UI design. In the following description, for purposes of explanation, numerous examples and specific details are set forth in order to provide a thorough understanding of embodiments according to the present invention. It will be evident, however, to one skilled in the art that embodiments as defined by the claims may include some or all of the features in these examples alone or in combination with other features described below, and may further include modifications and equivalents of the features and concepts described herein.

Figure 1:
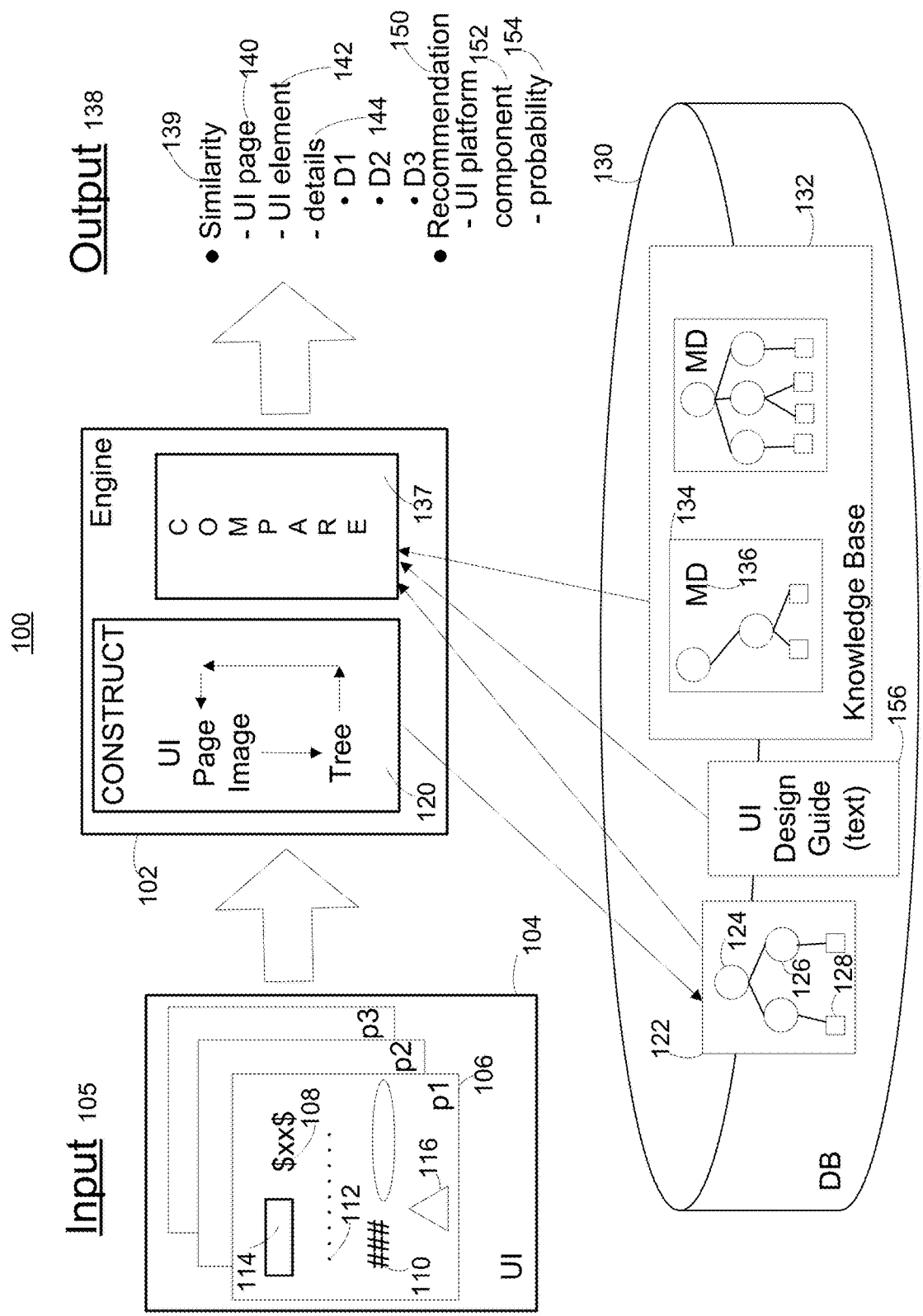
FIG. 1 shows a simplified diagram of a system according to an embodiment.

FIG. 1 shows a simplified view of an example system that is configured to implement verification of compliance of a UI design according to an embodiment. Specifically, system 100 comprises an engine 102 that is configured to receive a user interface 104 as an input 105.

The user interface includes one or more pages 106 as an array, each UI comprise a plurality of elements. One example of a UI element is a text string 108. Another example of a UI element is a numerical value 110. Still another example of a UI element is a horizontal divider 112. A further example of a UI element is an enclosed box 114 for data entry. Yet another example of a UI element is an icon 116.

The engine receives this input, and executes an iterative procedure 120 to construct therefrom a logic tree 122 for each UI. That logic tree exhibits a hierarchical structure reflecting the organization of elements within the user interface.

In particular, the logic tree comprises a root node 124, intermediate nodes 126. The intermediate notes are the logic terms. The leaf nodes 128 of the logic tree comprise the UI elements. The engine then stores the logic tree in a database 130.

Knowledge base 132 is also stored in the database. The knowledge base includes trees checked and known to be compliant from already-learned GUIs. That is, logic trees 134 within the knowledge base have been reviewed by a human and already determined to be compliant. This has also enriched with semantic metadata 136, e.g. where is the implemented code and some keywords which describe the GUI.

FIG. 1 shows the engine configured to compare 137 the first logic tree with the most similar trees from the knowledge base and semantic metadata that are present within the knowledge base 132. For example, in an embodiment adopting a Case-Based Reasoning (CBR) approach, the comparison may first be performed with an available solution. If sufficient similarity with a solution is not obtained, then the comparison is performed with a known problem.

Based upon this comparison, the engine generates an output 138 which includes a similarity metric, e.g., to a set of the most similar solution/problem 139 under a CBR approach. That similarity is useful for a designer or developer in assessing compliance of the UI of the first logic tree, with the semantic of previous learned compliant GUIs, specified as machine learned (ML) design guidelines. In this manner, the knowledge of an expert is implicitly presented in the data.

That similarity information can reference include specifics of the user interface, such as a page #140, a particular UI element 142, and various details 144 such interdependencies (including conditional probabilities) between UI elements.

Optionally, the engine may be further configured to output a recommendation 150. That recommendation may comprise a component 152 of a specific UI platform (e.g., Fiori), and may also include a probability 154.

As mentioned herein, the knowledge base includes logic trees reflecting the hierarchical structures of existing UIs known to be in compliance with design guidelines. In certain embodiments, the database may further comprise the machine learning design guidelines 156 themselves in text form.

According to certain embodiments, the user has the text of the UI design guide as available information, and the design guide text can be linked to the UI elements. The difference between the trees can be given as a recommendation.

Figure 2:
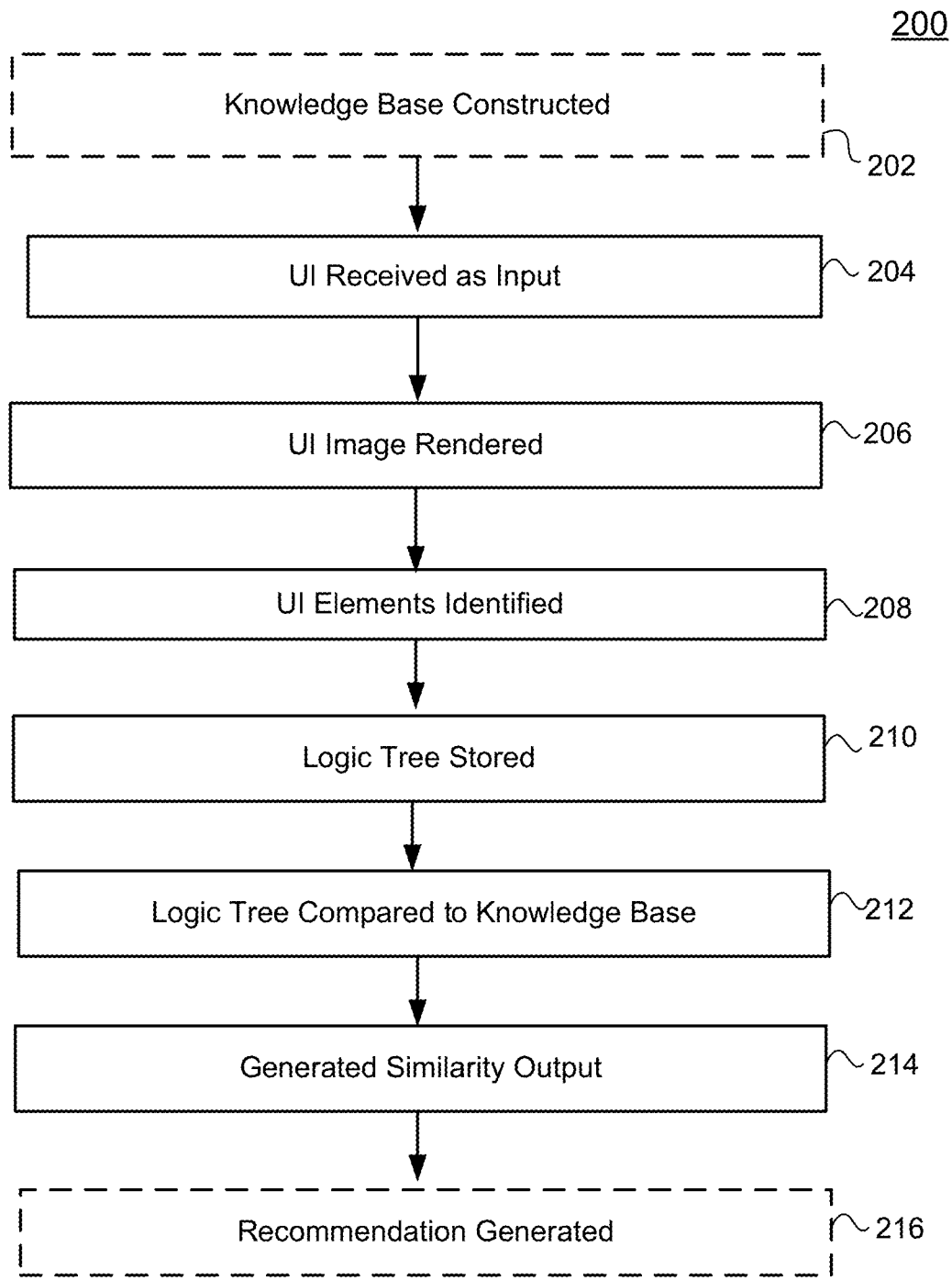
FIG. 2 shows a simplified flow diagram of a method according to an embodiment.

FIG. 2 is a flow diagram showing various actions taken in a method 200 according to an embodiment. At 202, an engine optionally constructs a knowledge base comprising logic trees that reflect a hierarchical structure of known user interfaces, and which are labeled with semantic metadata. Alternatively, rather than being constructed by the engine, the knowledge base may be constructed by another source and made accessible to the engine.

At 204, the engine receives as an input, a user interface (UI) comprising a plurality of elements. At 206, the engine renders an image of the UI.

At 208, the engine identifies the plurality of elements from the image according to a recursive procedure. That recursive procedure may involve successive image cropping. As referred to herein, a UI element may comprise an active button, an icon, a table, etc. Groups of related elements (e.g., a field and an icon) may comprise higher-level logic terms (e.g., a search field).

The logic term may combine different UI elements, and can be more specific to the particular UI platform. For example, the logic term search bar could differ between different UI platforms. Also, the semantic of the logic term can be similar between UI platforms, but the combination of the underlying UI elements may be different.

At 210, the engine stores the plurality of elements in a first logic tree exhibiting a first hierarchical structure. According to that hierarchical structure, the plurality of UI elements may be organized as leaf nodes. The logic terms may be represented as intermediate nodes.

At 212, the engine compares the first logic tree to second logic tree(s) present within the knowledge base. At 214, based upon the comparing an output is generated that indicates a similarity between the first logic tree and the second logic tree.

At 216, the engine may optionally further generate a recommendation regarding clusters of other elements that are present within the knowledge base.

Under a CBR machine learning approach, if a logic tree does not exist in the solution area, and logic tree is design-compliant (e.g., has passed a design gate or is already in the product), then the tree will be stored as a solution. If the logic tree does not exist and is not design compliant (e.g., has not passed a design gate), then the UI has to be redesigned. If the redesign is design compliant, it will be stored as a solution and the first logic tree from the first try will stored as the problem. The redesigned UI can thus be stored as a solution.

In summary, through the designing process, embodiments indicates the most similar UIs to the designer. The designer can accept one of those similar UIs. The tree from the designer which is not design compliant, will be stored as a problem, and the solution will be stored as the applied solution. Thus according to a CBR approach, the tree in the solution space is compliant with the design guidelines, but the tree in the CBR problem space does not need to be compliant. Further details are presented in connection with the example below.

Embodiments may offer one or more benefits. One possible benefit is that it may allow a non-designer to rapidly and easily determine any non-compliance of a mockup/UI with established UI design guidelines, without necessarily involving a design expert.

Furthermore, certain embodiments may provide specific recommendations to designers or developers, regarding UI design aspects that may be adapted from existing, valid UIs. This avoids designers and/or developers from having to reinvent the wheel in addressing any UI design compliance issues that are detected. According to embodiments, existing knowledge (semantic UIs and implemented code), can be better found and reused.

Specific details regarding approaches for implementing verification of compliance of a UI design, are now provided in connection with a particular example. This example shows how logic term elements may be learned by the system in order to construct the logic tree from a GUI. This is a separate step from creating a CBR knowledge database, which may be constructed previously. The focus of this example is upon deriving semantic meaning of the UI through the tree.

EXAMPLE

Here, this example is based upon certain technologies available from SAP SE, of Walldorf, Germany. In particular, this embodiment determines compliance of a particular UI with the design guidelines of the Fiori interface framework.

As described above, a first phase is to identify the basic interface elements as leaves of the UI utilizing in a recursive procedure, and then to generate the logic term elements in a second phase. In this specific example, the UI comprises a box having a red line on the bottom.

Figures 3A, 3B:
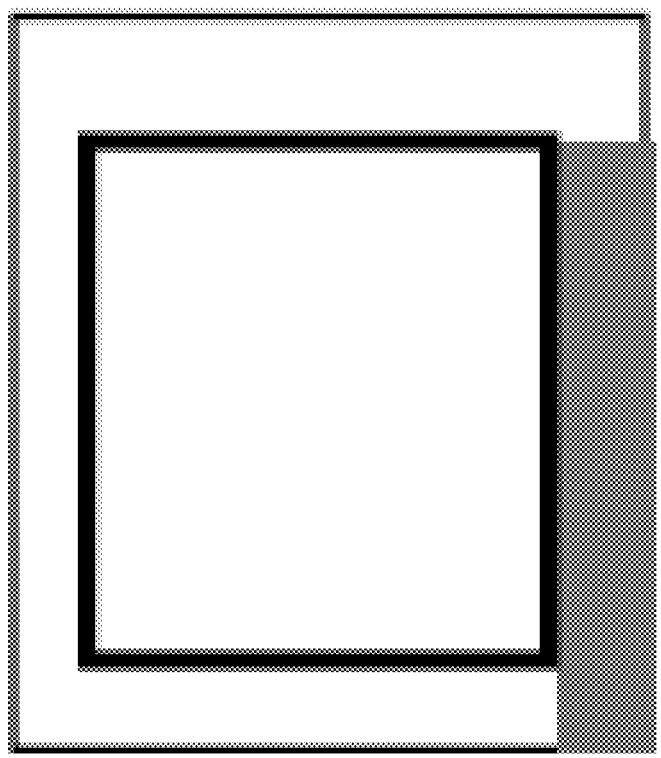
FIG. 3A shows a grayscale of an original UI image.
FIG. 3B shows a simplified view of the initial 2D array of pixels generated from the grayscale image.

In this example, additional color information is not needed for the procedure. Accordingly, the UI image is first converted to grayscale. FIG. 3A shows a grayscale of the original UI image.

A next step of the procedure is to convert the image to an array of numbers that reflects the pixels present therein. Here, converting the image to a 2D array presents the information of each pixel as a number between 0 (black) and 255 (white). FIG. 3B shows a simplified view of the initial 2D array of pixels generated from the grayscale image.

Next, the initial 2D array is converted to create a separate array that reflects information density. That is, the separate array is based upon transitions between pixels. It is these transitions, rather than the pixel information itself, that is used in compliance determination according to embodiments.

A transition is assigned a value of 1, with no transition assigned a value of 0. Embodiments start with vertical and then horizontal to save every transition in a separate array.

Figure 3D:
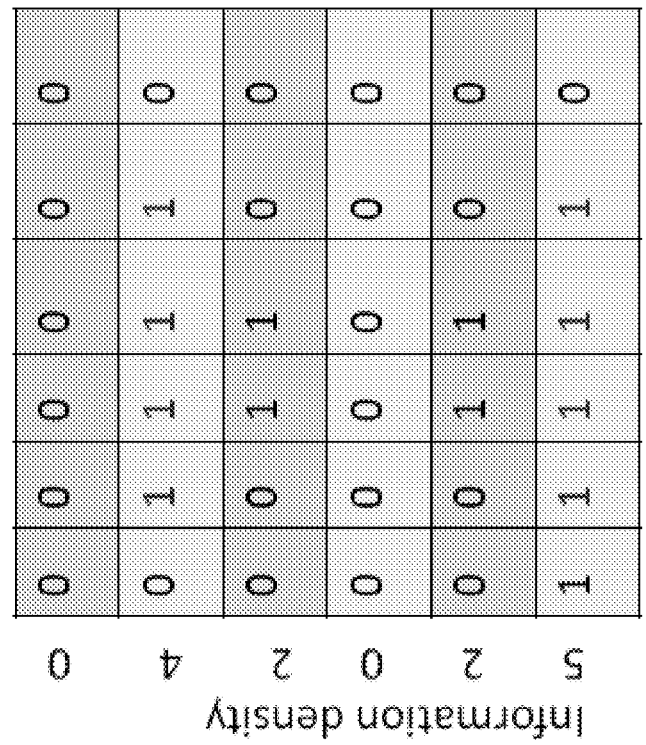
FIGS. 3C-3D show separate arrays reflecting information density in the vertical and horizontal directions, respectively.
Figure 3C:
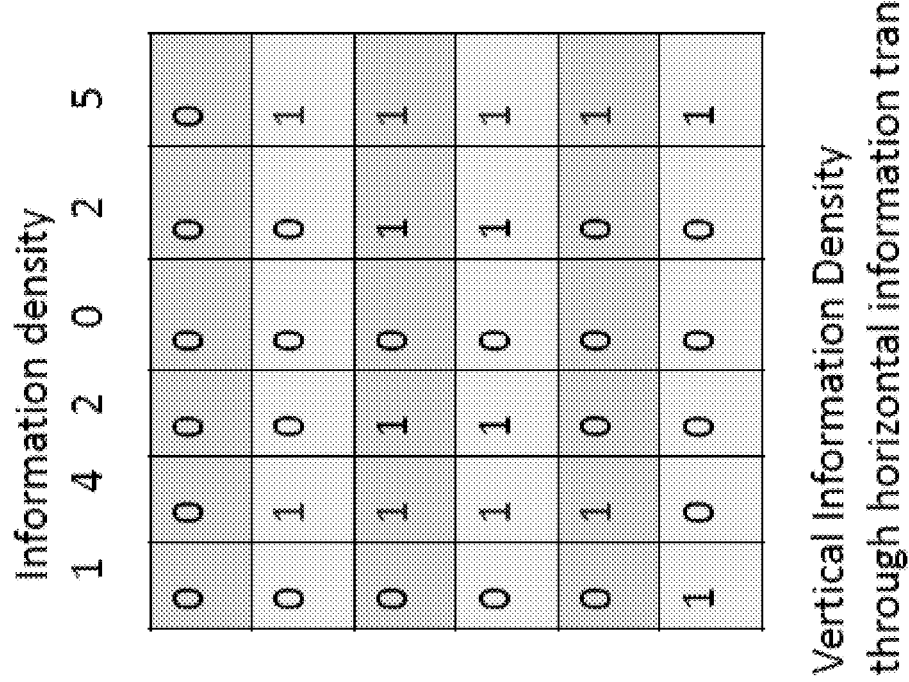

FIG. 3C shows a separate array reflecting information density in the vertical direction. FIG. 3D shows a separate array reflecting information density in the horizontal direction. Here, a box UI element is indicated because two vertical and horizontal lines have high information density and cross at a (corner) point.

Figure 4:
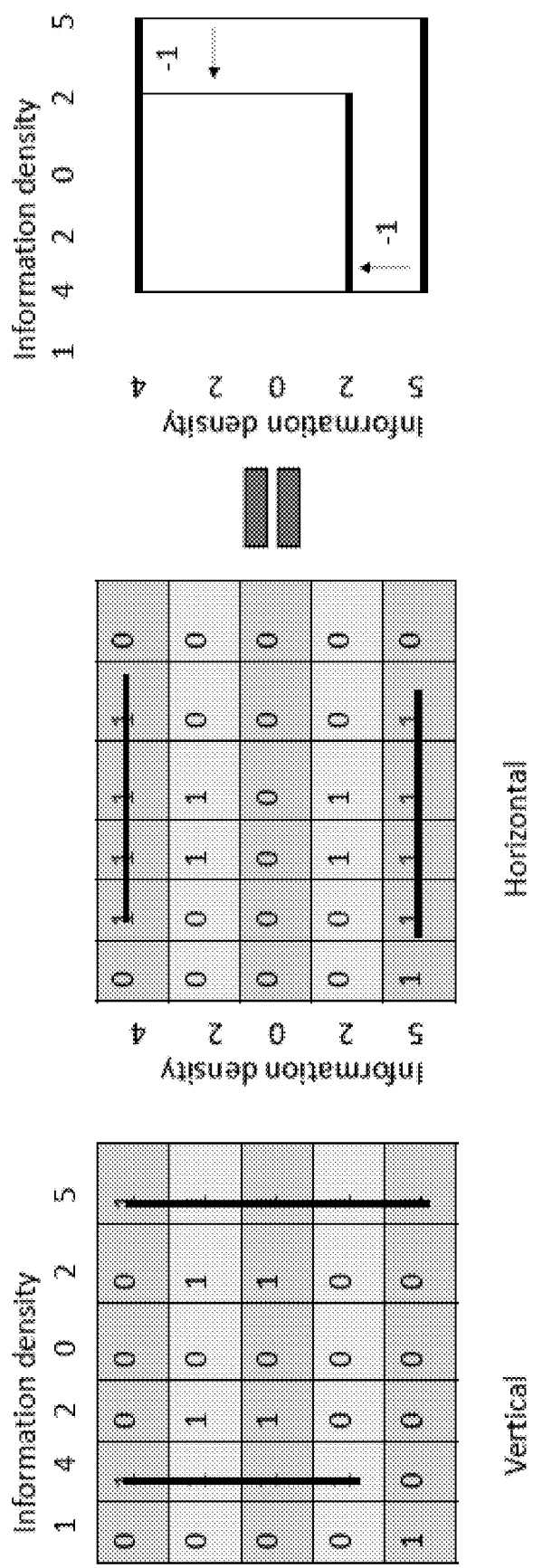
FIG. 4 is a simplified view showing image cropping and the repetition of the recursive procedure.

FIG. 4 shows the next step. First, null information on the border is deleted. Here, the first row has no needed information and can be cut out because in the horizontal and vertical analysis the information density is 0. If the density has 0 on both and is not on the corner, the image can be split into two for the recursive procedure.

Boxes may be detected as follows. Where the highest density is present (e.g., with a threshold=4), the image is cropped and the procedure recursively repeated. Every second high density point with a similar same value is subtracted by one in the position, because it goes out from the shape (box) and the first point goes into the shape.

According to an alternative approach, there is no need to subtract. There, it is possible to analyze the transition from both sides in a similar manner, e.g., going from top to bottom and bottom to top in a similar fashion.

Such an approach may offer certain benefits. For example, it may consume less computing power than other techniques such as Hough Lines. Also, the results (information density) can be reused for pattern detection (e.g., is a text, image, or line).

The process is then repeated. A max threshold (e.g., 95%) can help to classify a high information density. Similarly, a horizontal separator UI element may be revealed by a high horizontal information density with a low vertical density.

Next, the cropped image is recursively examined per the preceding approach. The new density is recalculated. On each recursive step, the image will be cropped, and the cropped image will be examined according to the procedure, until no more high density is available.

Additional information is presented as follows. If the density is 0, then no information is present (white line). There is a separation and the image can be cut. Alternatively, rather than zero, a minimum threshold may be defined.

After the recursive process, the UI elements will be detected. This can be a text or any UI shape (e.g., icon). Text may also be detected. Text can be classified by the high fluctuation in the information density data, horizontal and vertical. Alternatively, text recognition like corner detection can be used. If the engine knows where the text is, the text can be detected through Optical Character Recognition (OCR).

Figure 5:
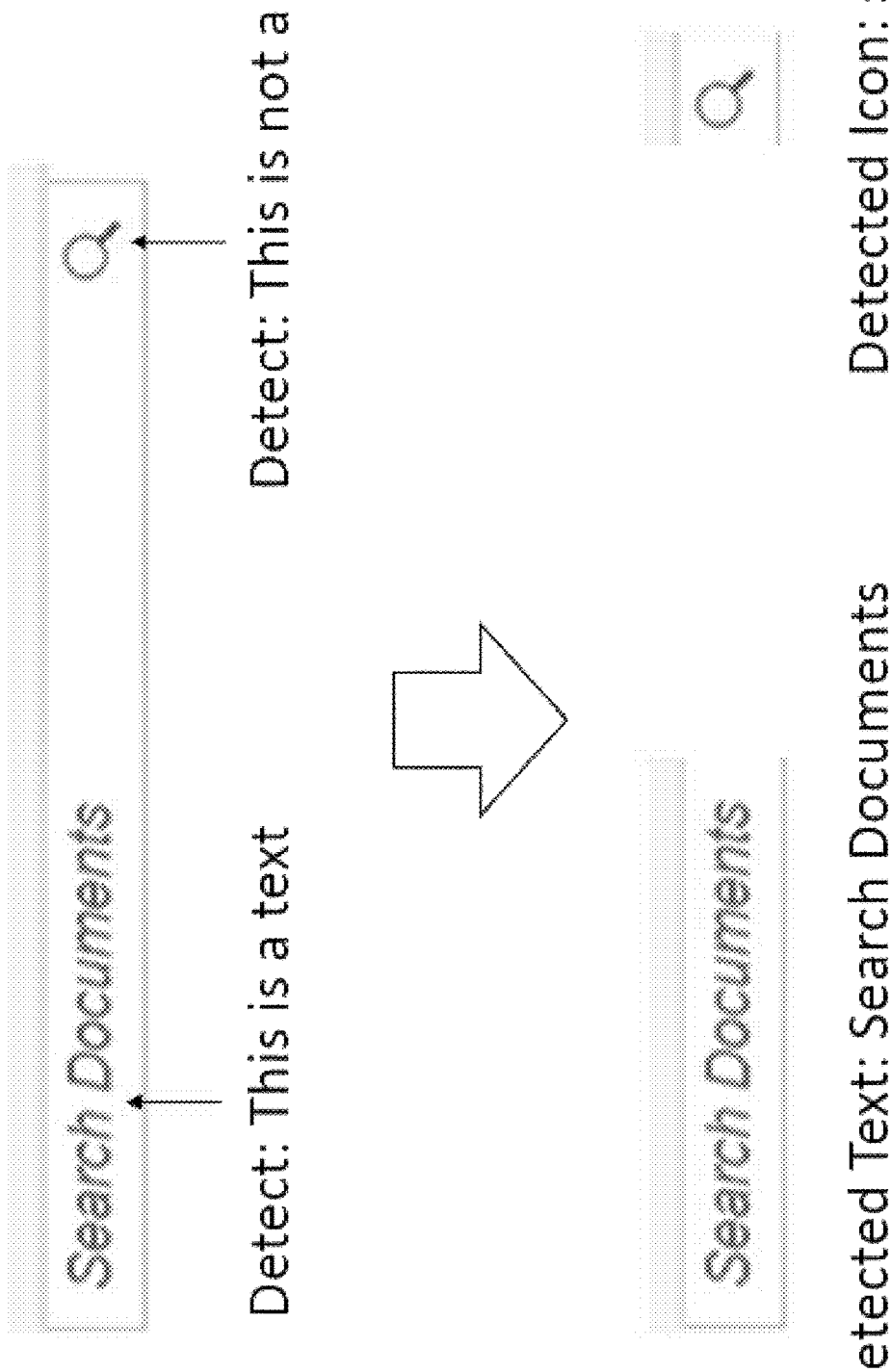
FIG. 5 illustrates a simplified view of recursive determination of a search box and a search icon as being distinct UI elements of a search field.

If no horizontal and vertical density is above/below the max and min threshold, then the recursive process is stopped. FIG. 5 illustrates a simplified view of recursive determination of a search box and a search icon as being distinct UI elements of a search field.

Figure 6:
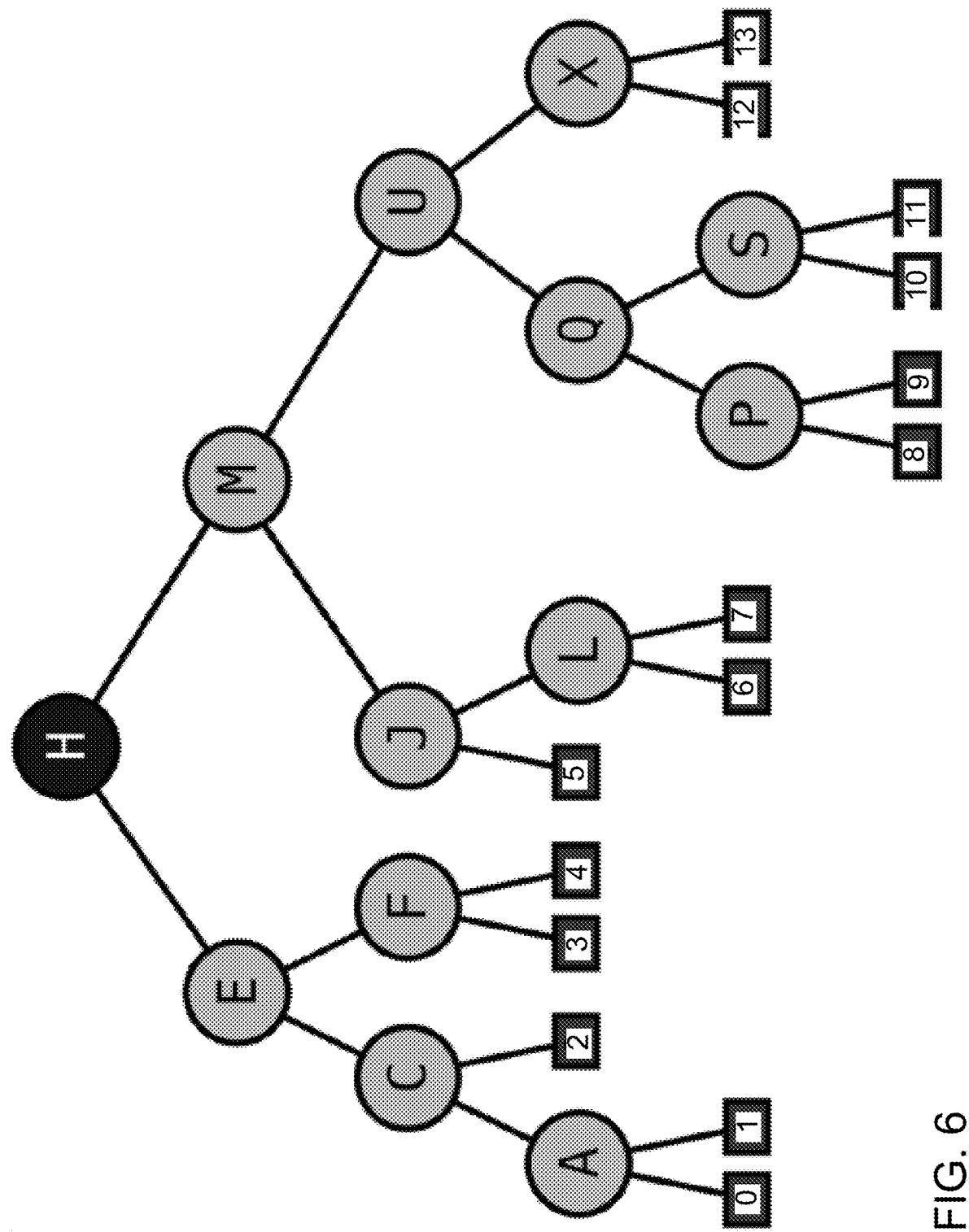
FIG. 6 shows the construction of a tree reflecting the hierarchical organization of the discrete elements within a UI.

FIG. 6 shows the construction of a tree reflecting the hierarchical organization of the discrete elements within the user interface. This tree comprises a root node H, intermediate nodes which present the logic terms by shaded circles, and numbered end "leaf" nodes not broken down into any further constituents.

As described above, a next stage is to build up a semantic knowledge base of UI elements with the logic terms. This assigns logic terms to the combination of recognized UI elements (leave) that are known to comply with design guidelines. As one example, a back button is left from the forward button (UI element) and together they present navigation (logic term).

The logic terms can be created by having an experienced UI designer assign identities to combinations of UI elements. In one particular example, the developer could recognize the combination of a search icon with a text field, as being the logic term of a search field, that is valid under established UI design guidelines. That recognized combination of interface elements as a search field is stored as metadata in a database serving as a repository for valid logic terms with their composed UI elements.

It is noted that logic terms can be also created from other logical terms or UI elements. Thus an intermediate node in a semantic logic tree, is created from lower-level logical terms.

Figure 7:
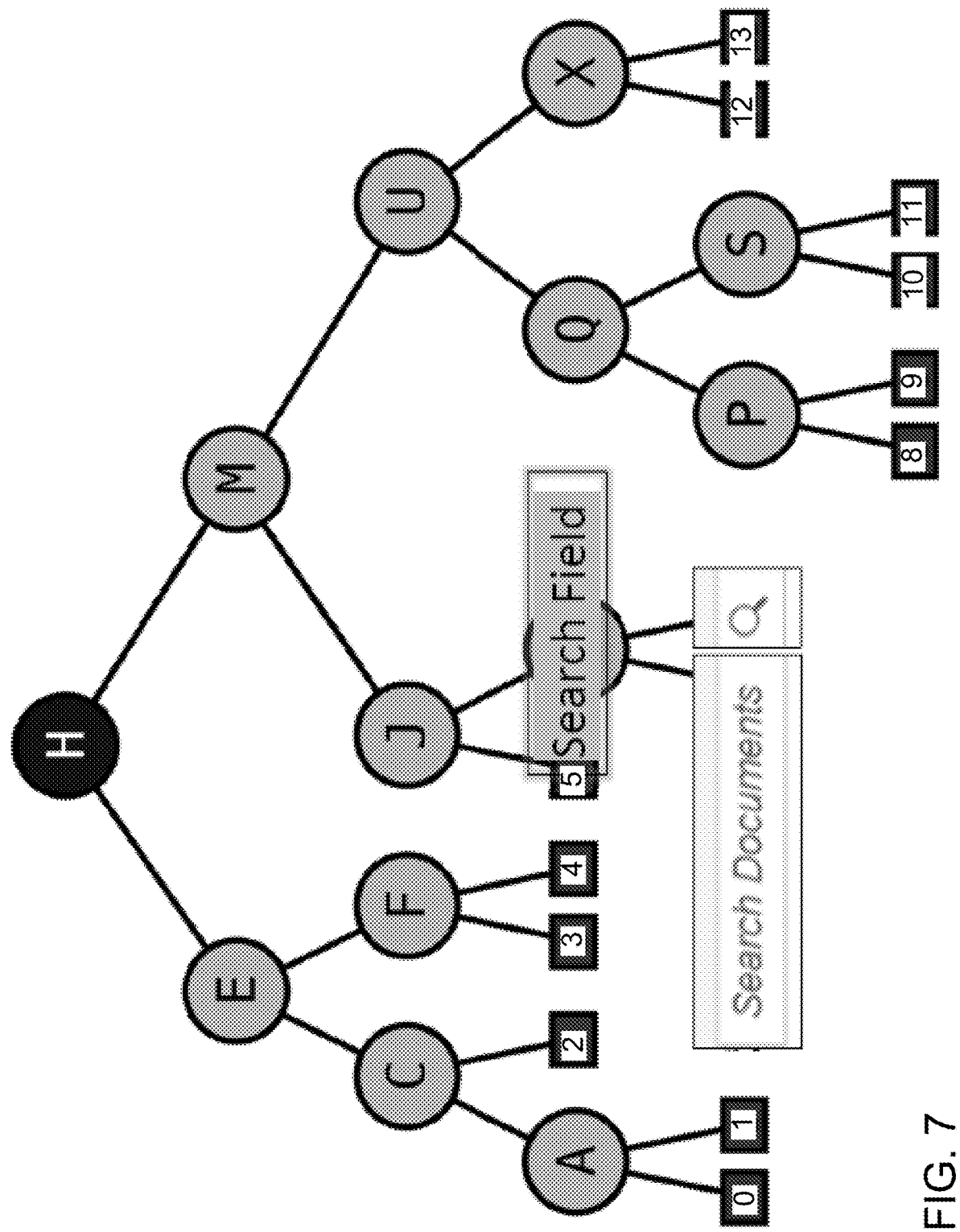
FIG. 7 shows a UI represented as a semantic logic tree.

FIG. 7 shows the UI represented as a semantic logic tree. The leaf nodes represent the different separated UI elements (e.g., search box, search icon). The intermediate nodes represent higher-up logic terms that are combinations of elements with the meaning (e.g., search field) specified by the designer.

Different parts of the tree will be similar if the meaning is the same. Thus different combinations of detailed elements can be collected in one higher level (e.g., in the search field the icon can be on the right side, or alternatively there is some addition icon). The higher up in the semantic logic tree, the more abstract the elements become.

The procedure iterates from the root level to the leaves and then back to the top. Meta information about the entire UI can be described, such that an engine can evaluate the meaning. If comparison with the semantic logic tree of a UI of the knowledge base reveals similarity, then the system can recommend the UI from the knowledge base.

Thus in the process of creating new designs for UIs, semantic information discovered can be used as data to build up suggestions by machine learning (like suggestions in GOOGLE™ SEARCH. Examples of such machine learning techniques can include but are not limited to ontology, Bayesian networks, semantic reasoning, and word to vector (W2Vec).

For example, the dependencies between UI elements in a GUI can be have conditional properties. In order to compare two different trees, Bayesian networks can be useful. In comparing meta information (e.g., tags) that is stored associated with a tree, the W2Vec technique can be employed.

Figure 8:
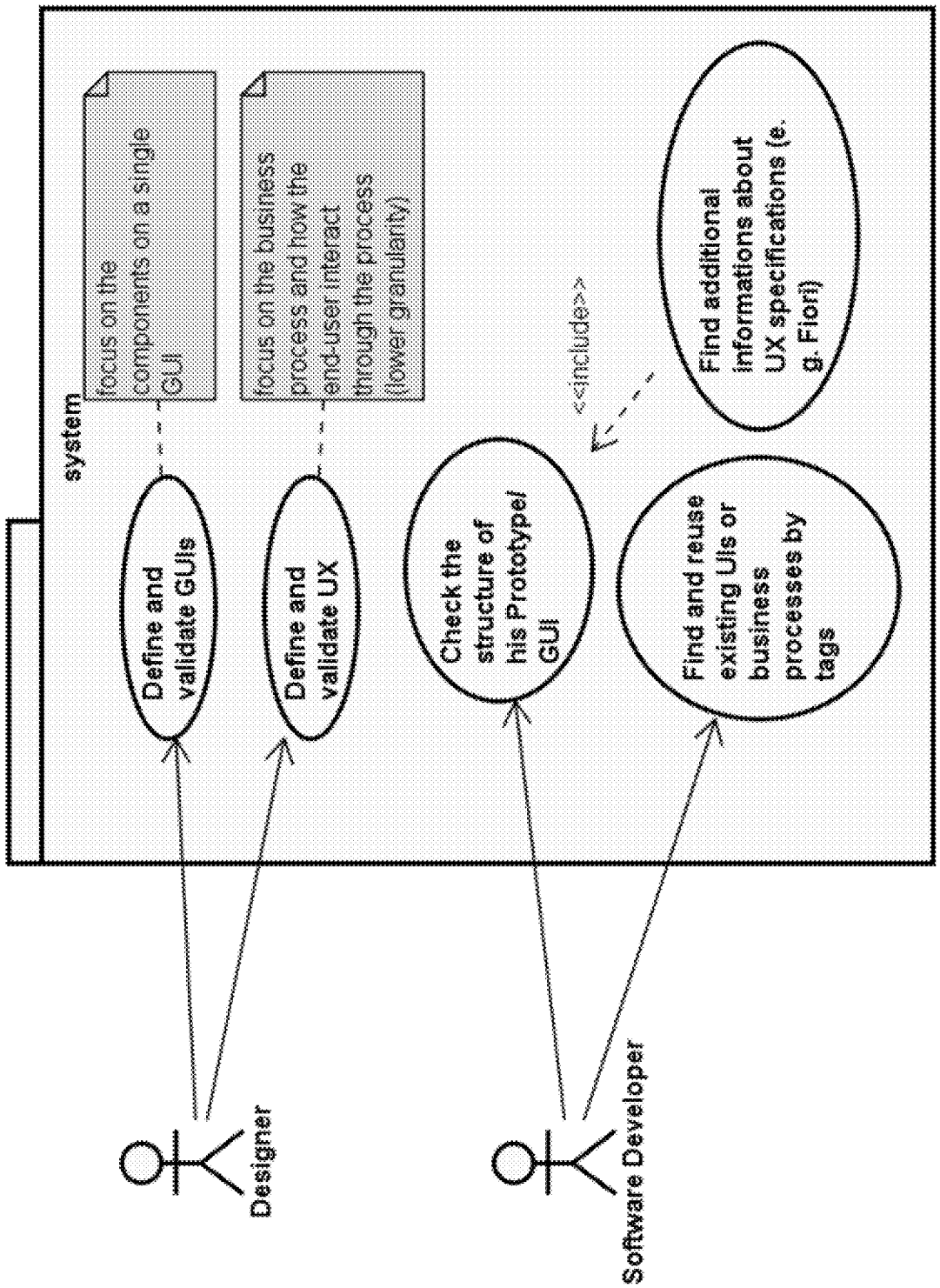
FIG. 8 is a simplified flow diagram showing interaction between a designer and a software developer, and a compliance system according to an embodiment.

FIG. 8 is a simplified flow diagram showing interaction between a designer and a software developer, and a compliance system according to an embodiment.

It is noted that two different GUIs from the knowledge base could conceivably solve the same problem based upon meta information, and that both GUIs are valid. That is, the engine does not have enough information to determine a difference between the two.

In such cases, additional meta information may be provided. For example, the designer could add a new meta tag allowing the engine to differentiate the two GUIs with the semantic response.

The results of comparison with the knowledge base may allow prediction of possible UI combinations. For example, if a designer wants to create a new UI, the system can offer existing solutions as recommendations though the given tags from the user to increase the efficiency through reuse.

Figure 9:
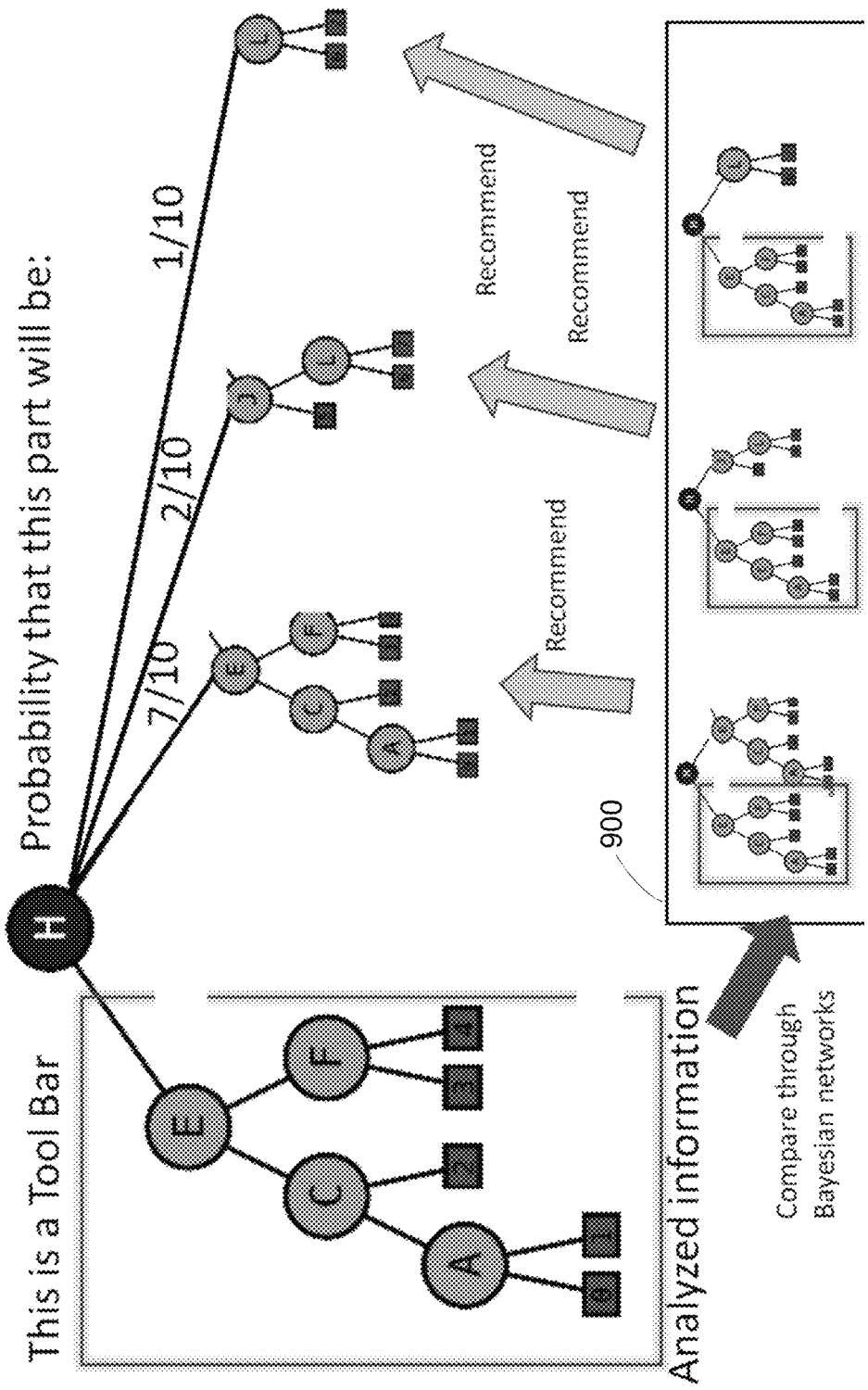
FIG. 9 shows a simplified view of an embodiment offering possible recommendations.

Accordingly, FIG. 9 shows a simplified view of an embodiment offering possible recommendations to the designer. The Case Based Reasoning 900 offers semantic logic trees in the solution space. In this example, the designer had created the tree on the left. The left part of the tree will compare with a set of other logic tree which gives the right part as recommendation.

The engine may perform the comparison, with the system providing these possible recommendations together with the probability (e.g., count of existing combinations) from which the designer can choose from. FIG. 9 shows comparison of the left side of the tree, and providing recommendations for the right side of the tree.

Here, the Bayesian networks may come into action. These compare the left tree to existing solutions in the Case Based Reasoning (CBR), and then give the user the best possible result. Additional meta information (e.g., in the form of tags) from the user, can help the engine to find better matches. In this manner the other machine learning approaches are employed, e.g., W2Vec semantic reasoning.

To address conditional structure, Bayesian networks may be employed for machine learning. Moreover, alternative types of reasoning may serve as the basis for machine learning according to embodiments. Bayesian networks offer the benefit of including conditional dependency, which is important to compare (generating the similarity metric) and to predict. A Bayesian network can learn from the examples of previous UIs through the count of combinations.

For example, to store the collected semantic UI information (e.g., the UI as tree and/or some additional meta-information through tags), case-based reasoning (CBR) may be employed.

Under a CBR approach, a designer describes the problem with meta language. Then, the system can afford the corresponding solution(s), e.g.: semantic logic trees, and also indicate where an actual implementation of that semantic logic tree as a UI can be found.

Figure 10:
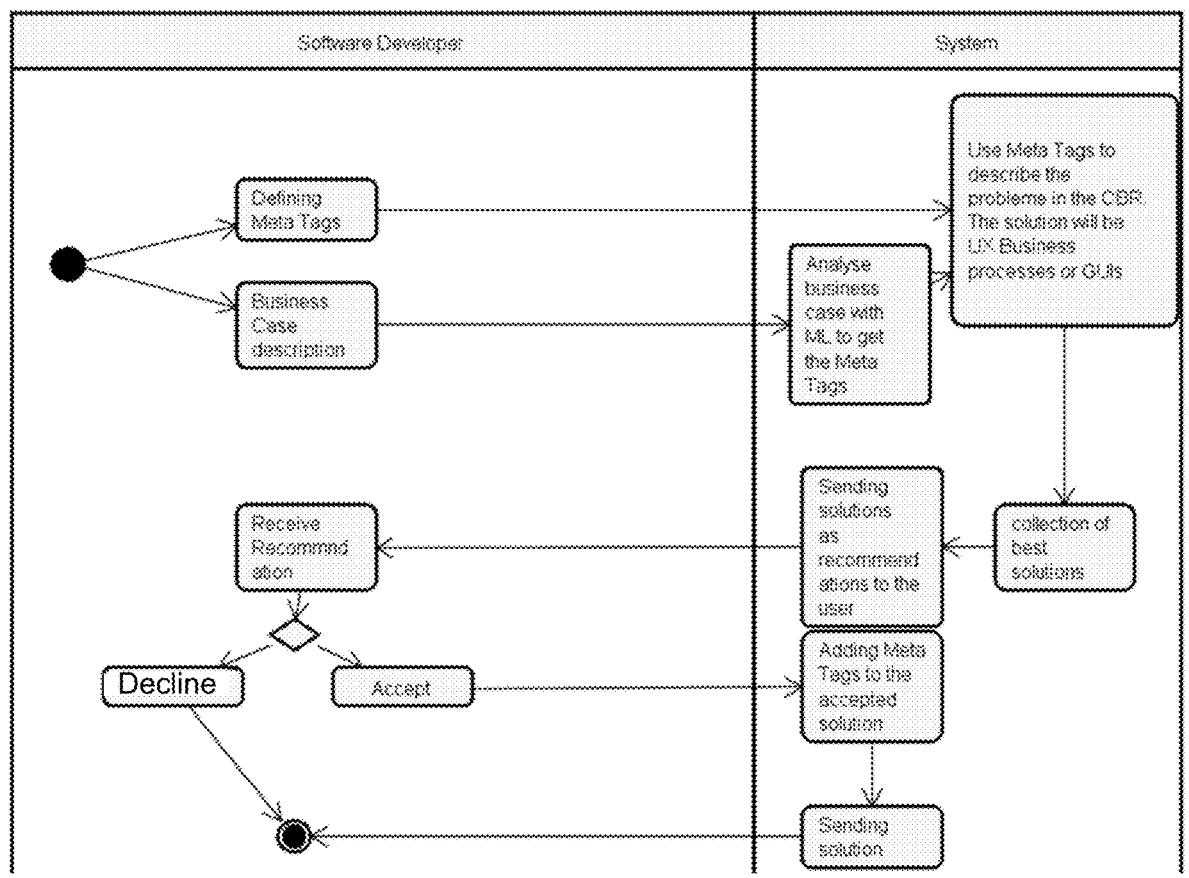
FIG. 10 is a simplified flow diagram showing an overview of the interaction between a software developer and a compliance system according to an embodiment.

FIG. 10 is a simplified flow diagram showing an overview of the interaction between a software developer and a compliance system according to an embodiment. This figure shows the software developer both defining meta tags, and also providing a business case description. The figure shows the recommendation system finding existing solutions by describing the problem with tags.

Figure 10A:
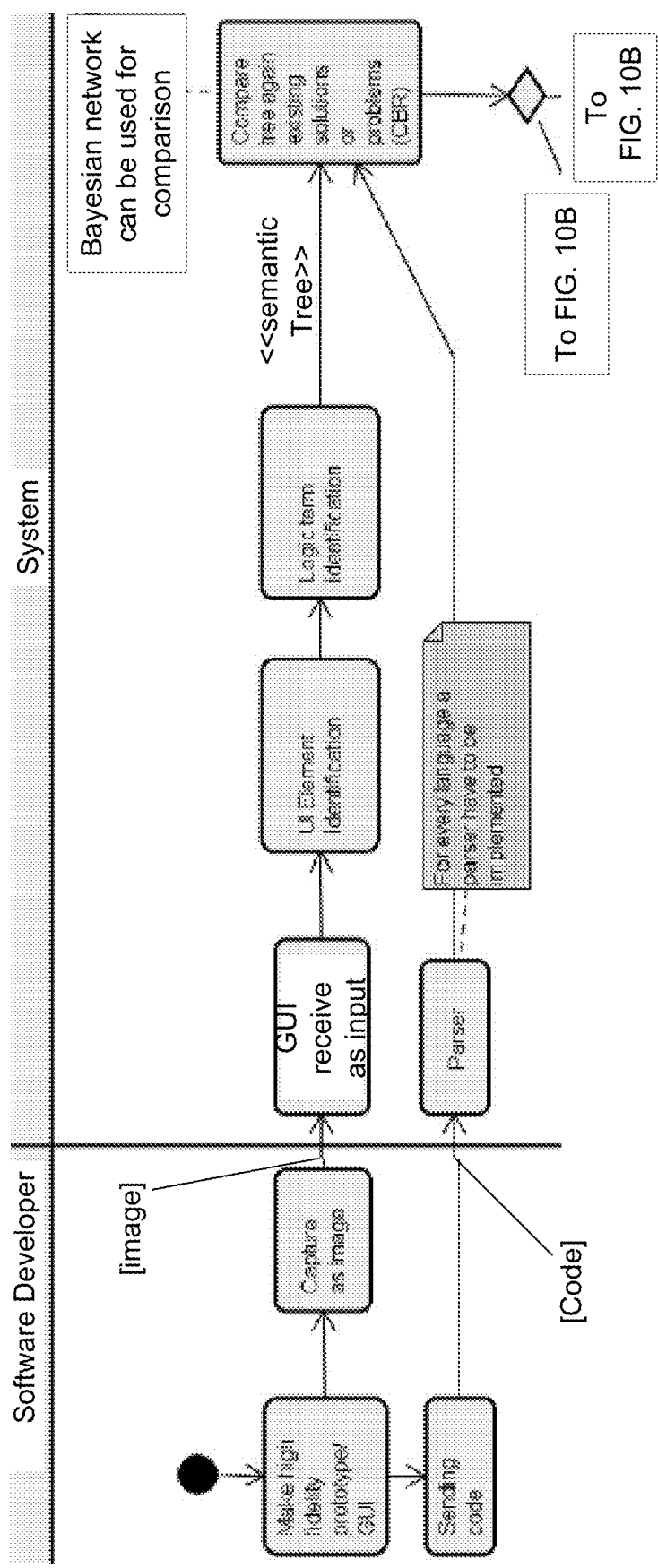
FIGS. 10A-B are simplified flow diagrams showing interaction between a software developer and a compliance system according to a use case.
Figure 10B:
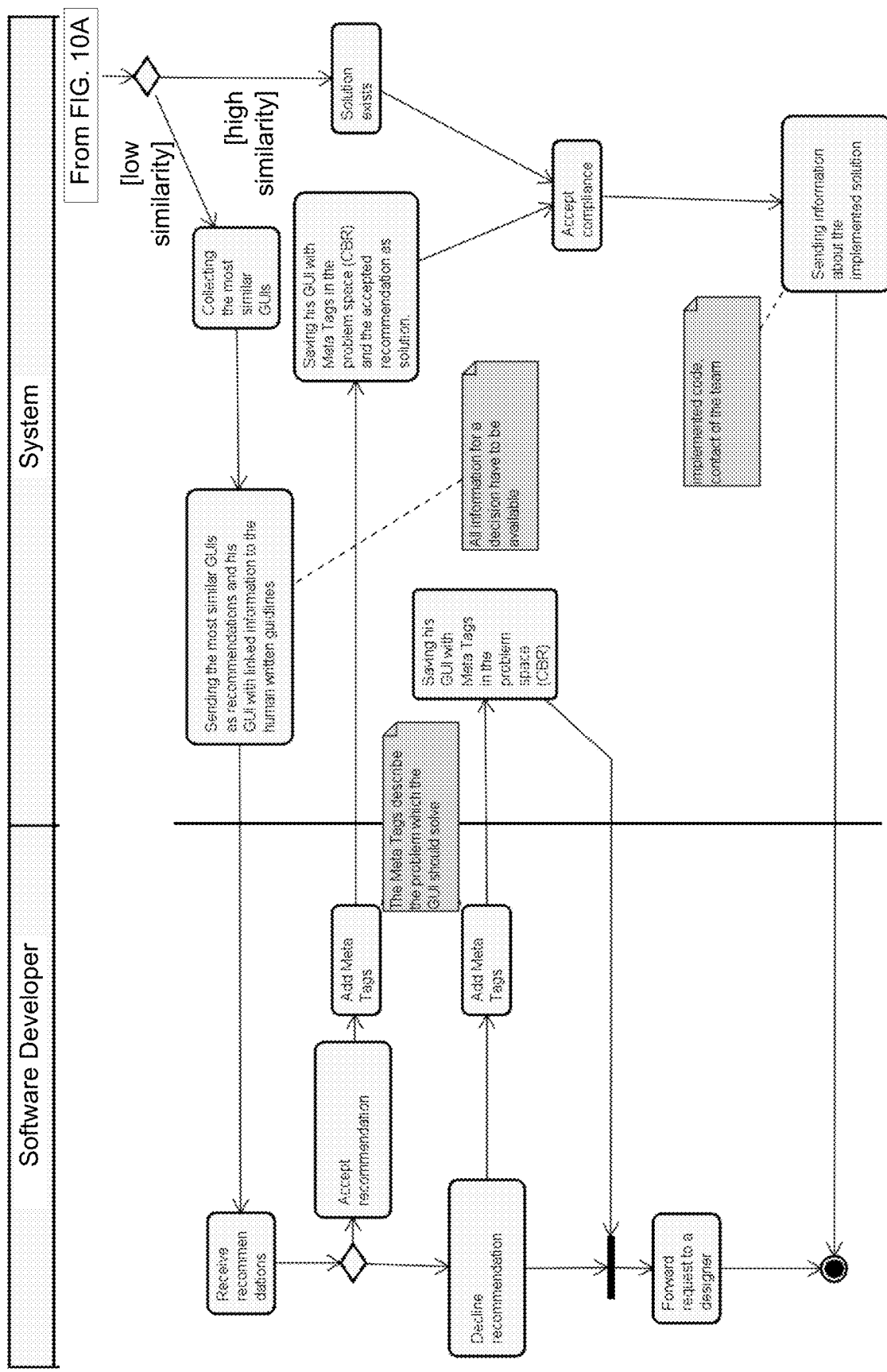

FIGS. 10A-B are simplified flow diagrams showing interaction between a software developer and a compliance system to check the structure of a prototype UI. In particular, FIG. 10A shows the combination of a Bayesian network with case based reasoning in order to perform comparison of a logic tree with existing problems or solutions.

FIG. 11 shows a simplified view of a machine learning approach utilizing case-based reasoning. Here, the engine may compare a problem description of the case-based reasoning, to the semantic metadata of the knowledge base.

Input for the CBR will be the tree and/or meta information. The engine compares that input against the solution space.

If the solution exists, then the input will automatically be in compliance.

If the input is only meta information, the engine may also return back the tree as output. This allows the user to know what the compliant UI should look like.

The user may disagree as to that returned UI, and seek to look up another solution. The CBR can then save the user's input as the problem, and the solution eventually chosen as the output. This represents the learning aspect of the CBR approach.

A similar process arises if the input does not currently exist in the solution space. Then, the user can agree to an existing solution and the CBR will store the input as the problem. The solution can be stored with the problem, or the user can forward his input to a design expert who checked the input for design compliance. If the expert agrees, the input will be stored as a solution. Thus, the solution space of the CBR is always design-compliant.

Meta information can be useful to indicate compliance only under specific contexts (e.g., for a specific product). In one example, the meta information can specify valid compliance only for the design guidelines of a particular project—e.g., for an Integrated Business Planning (IBP) project, matching requires=True.

So, both the tree and the specific meta information must be the same as input and solution in order to indicate design compliance. Otherwise, the solution will not completely match the input. In this manner, required tag information can be established in order to handle context-specific (e.g., product) deviation.

To summarize: in FIG. 11 the problem is represented by the logic tree. That tree is stored and then retrieved. If similar trees exist as a solution already in the knowledge database, then the comparison can be performed.

In some instances, however, the tree exists only as the problem. That is, the GUI is not compliant. Thus, a previous designer may have not found a solution to redesign a GUI to fit better into the UX.

Under such circumstances the CBR can offer the solution through a recommendation that is based upon similarity. In this way, the new design may be compliant, and the new solution can be stored in the CBR as a tree in the knowledge base for future reference.

Returning now to FIG. 1, while that particular embodiment depicts the engine as residing outside of the database itself, this is not required. According to alternative embodiments the engine could be integrated with the database itself, for example to leverage the processing power of the in-memory database engine of the in-memory database storing the library. One example is the HANA in-memory database available from SAP SE of Walldorf, Germany.

Figure 12:
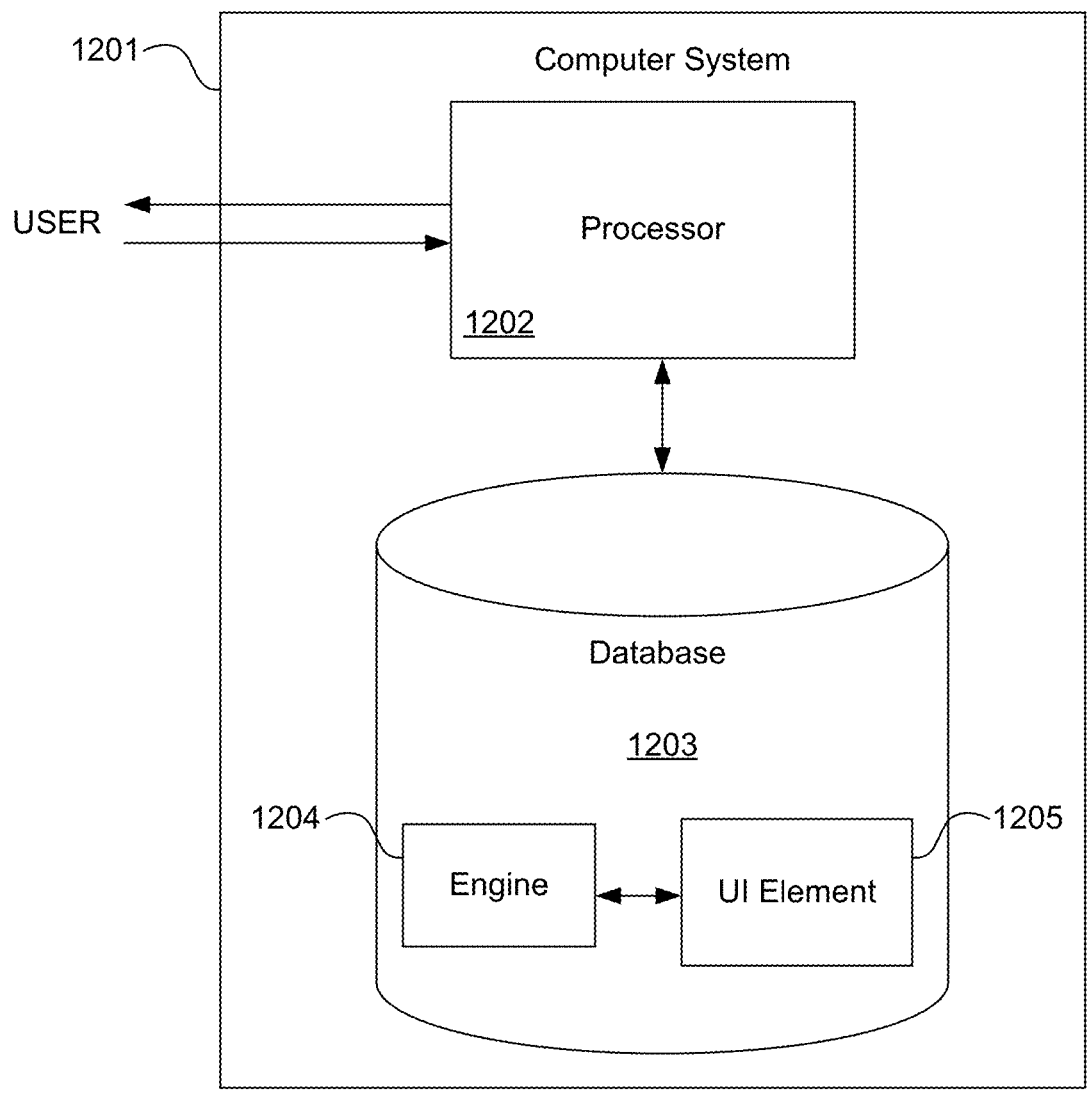
FIG. 12 illustrates hardware of a special purpose computing machine according to an embodiment that is configured to implement verification of compliance of a UI design.

FIG. 12 illustrates hardware of a special purpose computing machine configured to implement entity-based service operation for object-based persistence according to an embodiment. In particular, computer system 1201 comprises a processor 1202 that is in electronic communication with a non-transitory computer-readable storage medium comprising a database 1203. This computer-readable storage medium has stored thereon code 1205 corresponding to an element of a UI. Code 1204 corresponds to an engine. Code may be configured to reference data stored in a database of a non-transitory computer-readable storage medium, for example as may be present locally or in a remote database server. Software servers together may form a cluster or logical network of computer systems programmed with software programs that communicate with each other and work together in order to process requests.

Figure 13:
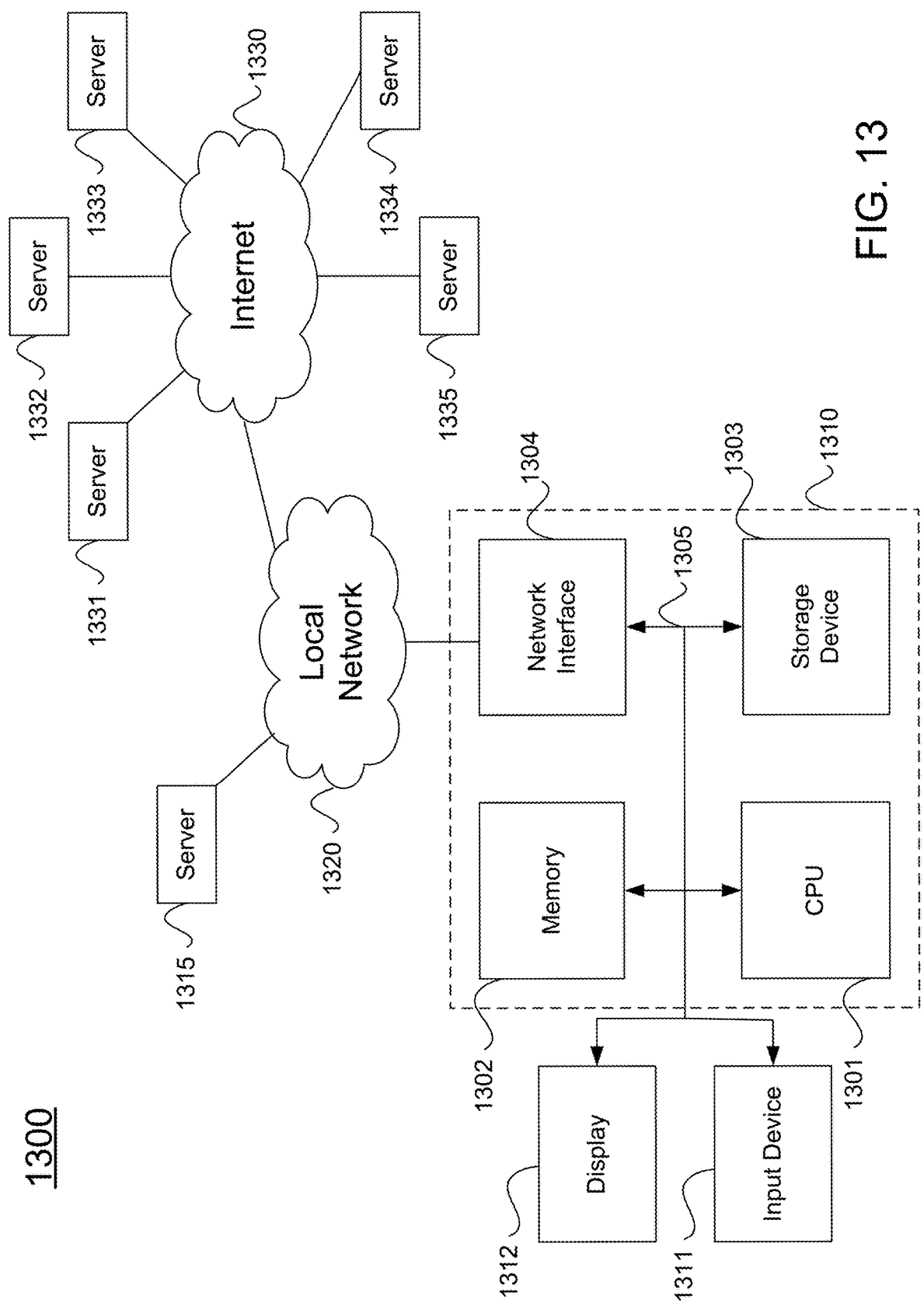
FIG. 13 illustrates an example computer system.

An example computer system 1300 is illustrated in FIG. 13. Computer system 1310 includes a bus 1305 or other communication mechanism for communicating information, and a processor 1301 coupled with bus 1305 for processing information. Computer system 1310 also includes a memory 1302 coupled to bus 1305 for storing information and instructions to be executed by processor 1301, including information and instructions for performing the techniques described above, for example. This memory may also be used for storing variables or other intermediate information during execution of instructions to be executed by processor 1301. Possible implementations of this memory may be, but are not limited to, random access memory (RAM), read only memory (ROM), or both. A storage device 1303 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 1303 may include source code, binary code, or software files for performing the techniques above, for example. Storage device and memory are both examples of computer readable mediums.

Computer system 1310 may be coupled via bus 1305 to a display 1312, such as a cathode ray tube (CRT) or liquid crystal display (LCD), for displaying information to a computer user. An input device 1311 such as a keyboard and/or mouse is coupled to bus 1305 for communicating information and command selections from the user to processor 1301. The combination of these components allows the user to communicate with the system. In some systems, bus 1305 may be divided into multiple specialized buses.

Computer system 1310 also includes a network interface 1304 coupled with bus 1305. Network interface 1304 may provide two-way data communication between computer system 1310 and the local network 1320. The network interface 1304 may be a digital subscriber line (DSL) or a modem to provide data communication connection over a telephone line, for example. Another example of the network interface is a local area network (LAN) card to provide a data communication connection to a compatible LAN. Wireless links are another example. In any such implementation, network interface 1304 sends and receives electrical, electromagnetic, or optical signals that carry digital data streams representing various types of information.

Computer system 1310 can send and receive information, including messages or other interface actions, through the network interface 1304 across a local network 1320, an Intranet, or the Internet 1330. For a local network, computer system 1310 may communicate with a plurality of other computer machines, such as server 1315. Accordingly, computer system 1310 and server computer systems represented by server 1315 may form a cloud computing network, which may be programmed with processes described herein. In the Internet example, software components or services may reside on multiple different computer systems 1310 or servers 1331-1335 across the network. The processes described above may be implemented on one or more servers, for example. A server 1331 may transmit actions or messages from one component, through Internet 1330, local network 1320, and network interface 1304 to a component on computer system 1310. The software components and processes described above may be implemented on any computer system and send and/or receive information across a network, for example.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A computer-implemented method comprising:
receiving as an input, a user interface (UI) comprising a plurality of elements;
rendering an image of the UI;
identifying the plurality of elements from the image according to a recursive procedure;
storing the plurality of elements in a first logic tree exhibiting a first hierarchical structure having the plurality of elements as leaf nodes, and logic terms as intermediate nodes;
using a Bayesian network, an in-memory database engine of an in-memory database comparing the first logic tree to a second logic tree that,
exhibits a second hierarchical structure,
is labeled with semantic metadata, and
is stored within a knowledge base of the in-memory database;
based upon the comparing, generating an output indicating a similarity between the first logic tree and the second logic tree;
generating a recommendation regarding a cluster of elements present in the knowledge base, the recommendation comprising,
a probability,
a user interface platform component, and
a location of a GIT address for reuse of code.

2. The method as in claim 1 wherein the recursive procedure comprises:
generating from the image, a first two-dimensional array reflecting pixel information; and
generating from the first two-dimensional array, a second two-dimensional array reflecting information density.

3. The method as in claim 2 wherein the recursive procedure further comprises cropping the image based upon the second two-dimensional array.

4. The method as in claim 1 further comprising constructing the knowledge base utilizing a machine learning technique.

5. The method as in claim 4 wherein the machine learning technique comprises case-based reasoning (CBR).

6. The method as in claim 5 wherein the comparing is first performed between the semantic metadata and a solution description, and is then only performed if necessary between the semantic metadata and a problem description.

7. A non-transitory computer readable storage medium embodying a computer program for performing a method, said method comprising:

receiving as an input, a user interface (UI) comprising a plurality of elements;

rendering an image of the UI;

identifying the plurality of elements from the image according to a recursive procedure;

storing the plurality of elements in a first logic tree exhibiting a first hierarchical structure having the plurality of elements as leaf nodes, and a plurality of logic terms as intermediate nodes;

utilizing a Bayesian network, an in-memory database engine of an in-memory database comparing the first logic tree to a second logic tree that,
 exhibits a second hierarchical structure,
 is labeled with semantic metadata, and
 is stored within a knowledge base of the in-memory database;

based upon the comparing, generating an output indicating a similarity between the first logic tree and the second logic tree; and generating a recommendation regarding a cluster of elements present in the knowledge base, the recommendation comprising,
 a probability,
 a user interface platform component, and
 a location of a GIT address for reuse of code.

8. The non-transitory computer readable storage medium as in claim 7 wherein the method further comprises:

generating from the image, a first two-dimensional array reflecting pixel information; and generating from the first two-dimensional array, a second two-dimensional array reflecting information density.

9. The non-transitory computer readable storage medium as in claim 8 wherein the recursive procedure further comprises cropping the image based upon the second two-dimensional array.

10. The non-transitory computer readable storage medium as in claim 7 wherein the method further comprises:

constructing the knowledge base utilizing a machine learning technique.

11. The non-transitory computer readable storage medium as in claim 10 wherein:

the machine learning technique comprises case-based reasoning; and the comparing is performed between the semantic metadata and a solution description.

12. A computer system comprising:

one or more processors;

a software program, executable on said computer system, the software program configured to cause an in-memory database engine of an in-memory database to:

receive as an input, a user interface (UI) comprising a plurality of elements;

render an image of the UI;

identify the plurality of elements from the image according to a recursive procedure;

store the plurality of elements in a first logic tree exhibiting a first hierarchical structure having the plurality of elements as leaf nodes, and a plurality of logic terms as intermediate nodes;

use a Bayesian network to compare the first logic tree to a second logic tree that,
 exhibits a second hierarchical structure,
 is labeled with semantic metadata, and
 is stored within a knowledge base of the in-memory database;

based upon the comparing, generate an output indicating a similarity between the first logic tree and the second logic tree; and generate a recommendation regarding a cluster of elements present in the knowledge base, the recommendation comprising,
 a probability,
 a user interface platform component, and
 a location of a GIT address for reuse of code.

13. The computer system as in claim 12 wherein the software program is further configured to cause the in-memory database engine to construct the knowledge base utilizing a machine learning technique.

14. The computer system as in claim 13 wherein:

the machine learning technique comprises case-based reasoning; and the software program is configured to cause the in-memory database to compare the semantic metadata and a solution description.

15. The computer system as in claim 12 wherein the recursive procedure comprises:

generating from the image, a first two-dimensional array reflecting pixel information;

generating from the first two-dimensional array, a second two-dimensional array reflecting information density; and cropping the image based upon the second two-dimensional array.

* * * * *